United States Patent [19]
Johnson

[11] Patent Number: 4,953,685
[45] Date of Patent: Sep. 4, 1990

[54] STEP CHAIN FOR CURVED ESCALATOR

[75] Inventor: Gerald Johnson, Farmington, Conn.

[73] Assignee: Otis Elevator Company, Farmington, Conn.

[21] Appl. No.: 391,893

[22] Filed: Aug. 10, 1989

[51] Int. Cl.[5] .............................................. B65G 21/00
[52] U.S. Cl. .................................... 198/328; 198/334; 198/778
[58] Field of Search ............... 198/328, 326, 778, 852, 198/334, 792

[56] References Cited

U.S. PATENT DOCUMENTS

| | | | |
|---|---|---|---|
| 617,779 | 1/1899 | Seeburger | 198/328 |
| 685,019 | 10/1901 | Venn | 198/328 |
| 723,325 | 3/1903 | Souder | 198/328 X |
| 727,720 | 5/1903 | Venn | 198/328 |
| 782,009 | 2/1905 | Dodge | 198/328 |
| 967,710 | 8/1910 | Bennett | 198/328 |
| 984,495 | 2/1911 | Seeberger | 198/328 |
| 984,858 | 2/1911 | Seeberger | 198/328 |
| 999,885 | 8/1911 | Seeberger | 198/328 |
| 1,023,443 | 4/1912 | Seeberger | 198/324 |
| 2,695,094 | 11/1954 | Riley | 198/328 |
| 2,823,785 | 2/1958 | Hefti | 198/17 |
| 3,878,931 | 4/1975 | Luna | 198/328 |
| 4,066,161 | 1/1978 | Michalon et al. | 198/334 |
| 4,508,205 | 4/1985 | Aulagner et al. | 198/334 |
| 4,662,502 | 5/1987 | Nakatami | 198/328 |
| 4,726,460 | 2/1988 | Otomo | 198/328 |
| 4,730,717 | 3/1988 | Sugita | 198/328 |
| 4,732,257 | 3/1988 | Mathis et al. | 198/792 X |
| 4,739,870 | 4/1988 | Saito | 198/328 |
| 4,746,000 | 5/1988 | Nakatami et al. | 198/328 |
| 4,842,121 | 6/1989 | Michalon | 198/334 |
| 4,883,160 | 11/1989 | Sansevero et al. | 198/328 |
| 4,884,673 | 12/1989 | Rivera | 198/328 |
| 4,895,239 | 1/1990 | Johnson et al. | 198/328 |

FOREIGN PATENT DOCUMENTS

| | | | |
|---|---|---|---|
| 3441845A1 | 6/1985 | Fed. Rep. of Germany | 198/326 |
| 48-25559 | 7/1973 | Japan . | |
| 58-220077 | 12/1983 | Japan . | |
| 292641 | 6/1928 | United Kingdom | 198/326 |

*Primary Examiner*—Joseph E. Valenza
*Assistant Examiner*—Cheryl Gastineau
*Attorney, Agent, or Firm*—William W. Jones

[57] ABSTRACT

The steps of the escalator move along a curved path which has a fixed constant radius when viewed in plan. The step chain also follows the constant radius path and thus its effective length must vary at different locations along its path of travel in order to keep the step rollers on their constant radius tracks. The effective length of the step chain is varied using an eccentric pivot cam at chain link connections spaced along the chain whereby the degree of overlap of adjacent links can be changed by controlling the path along which cam actuating rollers travel. The cam actuating rollers control operation of the eccentric pivot cam link connections.

11 Claims, 7 Drawing Sheets

STEP CHAIN FOR CURVED ESCALATOR

TECHNICAL FIELD

This invention relates to a curved escalator construction, and more particularly to a curved escalator having a path of travel defined by a fixed center, constant radius arc when viewed in plan.

BACKGROUND ART

Escalators which follow a curved path of travel from entry landing to exit landing are generally known in the prior art. There are two general approaches which have been taken in the prior art to designing an operable curved escalator. One approach involves the use of a path of travel which, in plan, is defined by an arc having varying radii of curvature and emanating from a shifting center. The other approach involves the use of a path of travel which, in plan, is defined by an arc of constant radius struck from a fixed center.

Patent publications which relate to the aforesaid first approach include: Japanese Patent Publication No. 48-25559 of July, 1973; German Patent Publication No. 3,441,845, June 13, 1985; U.S. Pat. No. 4,662,502, Nakatani et al, granted May 5, 1987; and U.S. Pat. No. 4,746,000, Nakatani et al, granted May 24, 1988.

Patent publications which relate to the aforesaid second approach include: U.S. Pat. Nos. 685,019, Oct. 22, 1901; 723,325, Mar. 24, 1903; 727,720, May 12, 1903; 782,009, Feb. 7, 1905; 967,710, Aug. 16, 1910; 2,695,094, Nov. 23, 1954; 2,823,785, Feb. 18, 1958; 3,878,931, Apr. 22, 1975; 4,726,460, Feb. 23, 1988; 4,730,717, Mar. 15, 1988; 4,739,870, Apr. 26, 1988; British Patent No. 292,641, June 22, 1928; and Japanese Patent Disclosure No. 58-220077, 1983.

Japanese Patent Disclosure No. 58-220077, dated Dec. 21, 1983 discloses a curved escalator which has a constant radius, fixed center arcuate path of travel when viewed in plan. When the treads of the escalator move from the horizontal landing to the constant slope intermediate zone, they are properly repositioned by accelerating and decelerating their inside edges in the transition zones adjacent the landings. The differential movement of the inside tread edges is accomplished with pivoting links which interconnect the step axles of adjacent steps and which are joined at pivot points provided with rollers that traverse a track. The step axles also have rollers at their inside ends which travel over another track vertically spaced from the link roller track. The position of the inside edges of the steps is varied in the transition zone by varying the vertical distance between the inside step axle roller track and the link roller track beneath it. The links lengthen in the constant slope portion of the escalator and shorten in the horizontal landing and turn around zones. The steps are engaged by driving chains which connect to the step axles only in the constant slope zone where the position of the steps relative to each other remains constant. The drive chains do not contact the step axles in the transition, landing, or turn around zones. Varying the position of the inside edge of the steps requires that the connecting links be shortened in the horizontal and turn around zones of the escalator, and the use of two separate tracks for the inside step axle roller and for the adjustment link rollers, requires that the adjustment links will always be skew throughout the entire path of travel of the escalator. The use of two separate axle roller and link roller tracks also requires that the drive housing and tread reverse sprockets be vertically elongated.

Charles D. Seeberger was a turn-of-the-century inventor who obtained U.S. Pat. Nos. 617,778, granted Jan. 17, 1899; 617,779, granted Jan. 17, 1899; 984,495, granted Feb. 14, 1911; 984,858, granted Feb. 21, 1911; and 999,885, granted Aug. 8, 1911, which all relate to curve escalators. The 617,779 patent discusses the need to shorten and lengthen step chains in a curved escalator having a path of travel which has portions with different radii. The step chains are formed with segments which are threadably connected to each other. The segments are rotated by a pinion mechanism to unscrew, or tighten the threaded connections whereby the chain is lengthened or shortened when necessary. The 984,495 patent states that a curved escalator with a fixed radius, constant center cannot have both ends of adjacent step axles connected to each other by links of fixed length. A scissor connection is then made between succeeding axles, and a slight adjustment of this connection is made when the steps move from the curved horizontal track section to the inclined curved section of the track. The adjustment is described at Page 3, line 119 to Page 4, line 28 of the patent. The 999,885 patent describes a curved escalator having its steps connected together at their inner and outer edges, with the outer edge connection being of constant length, and the inner edge connection being variable by reason of adjustable links.

DISCLOSURE OF INVENTION

This invention relates to a step chain and track assembly for use in a curved or spiral escalator of the type having a fixed center, constant radius arcuate path of travel when viewed in plan. The assembly of this invention takes into account that in the escalator of the type specified, the steps, as they pass from the horizontal landing entry area into and through the entry transitional area to the constant slope area, will have to pivot with respect to each other in order to have their tread surfaces remain horizontal. This pivoting movement is accomplished by moving one side of the steps at a different angular velocity than the other side of the steps as the latter move through the entry transition zone and through the constant slope zone when viewed in plan. In the exit transition zone, the differential movement of the sides of the steps is reversed so that the steps then pivot back to their original orientation relative to each other. Thus the velocities of the steps and their angular positions will vary at different locations along the path of movement thereof. In order to allow the pivotal step movement without binding the steps together, the step risers will be formed with a modified conical configuration, the details or specifics of which will be determined by the radius of curvature of the path of travel of the escalator, and the size of the step.

The differential velocity and pivotal movement of the steps can be accomplished in the assembly of this invention by changing the effective length of one or both of the step chains without changing the length of the individual chain links. It should be noted that the actual length of the step chain is not altered, but only its effective length is changed. In performing the necessary shifting of the steps, either the inner or outer step chain can be effectively lengthened and shortened in appropriate fashion, or both the inner and outer step chains can be appropriately lengthened and shortened in a complementary manner, i.e., one will be shortened and the other simultaneously lengthened to accomplish the intended result. The step chains consist of a plurality of links which are pivotably connected together and which are also connected to the roller axles on the steps.

Certain of the chain link pivot connections are formed with eccentric pivot cams with associated cam actuating roller means, as will be described in greater detail hereinafter. The step roller axles carry rotating rollers which move on tracks mounted beneath the steps, in a known manner. In the assembly of this invention, certain of the chain link pivot connections are operable to shorten and lengthen the effective length of one of the inside or outside chains, or both of them. These certain length-altering link pivot connections are disposed between successive roller axle chain link joints, and utilize eccentric pivot cams to alter the effective length of the chain. The chain links at these eccentric pivot cam connections have laterally overlapping ends which are connected together by a bearing pin. The bearing pin in turn is connected to a pin rotational mechanism whereby the bearing pins can be selectively rotated in the ends of the inner sets of links.

The bearing pin rotational mechanism operates on an axis which is eccentric or offset from the axis of rotation of the bearing pins, whereby rotation of the bearing pins causes an axial camming of the inner sets of certain of the links in the chain to occur. This shortens the effective length of the chains. The maximum amount of link camming shift occurs when the bearing pins are rotated through a 180° angle. Thus a 180° rotation of the bearing pins in one direction will shorten the chains and a reverse 180° rotation of the bearing pins will lengthen the chain.

The bearing pin rotation is accomplished by the use of a lever or some other actuator which is connected to the eccentric pivot cams so that when the lever pivots or swings, the eccentric pivot cam is also rotated to cause rotation of the bearing pins. Pivoting of the cam lever is controlled by rollers mounted in the lever which follow actuating roller tracks in the escalator assembly. When the actuating tracks move toward or away from the chain vertically, the actuating cam lever will pivot accordingly causing the lengthening or shortening of the effective length of the chains. The cam levers can be connected to the eccentric pivot cams by means of gears; chains and sprockets; or can be directly keyed to the eccentric pivot cams. The rate of change of vertical offset between the two actuating tracks determines the rate of change of the effective chain length, and thus the rate of change of the step velocity.

In accordance with this invention, in the entry transitional zone, i.e., the transitional zone between the entry landing and the constant slope portion of the escalator, the effective length of the chain or chains will shorten or lengthen, as the case may be, and the reverse will happen in the exit transitional zone which connects the constant slope portion of the escalator with the exit landing.

It is therefore an object of this invention to provide an escalator-driving step chain assembly for use in a curved escalator having a fixed center and constant radius path of travel when viewed in plan.

It is an additional object of this invention to provide an assembly of the character described wherein the steps of the escalator are pivoted with respect to each other as the steps move to or from horizontal landing zones from or to a constant slope intermediate zone.

It is a further object of this invention to provide an assembly of the character described wherein the pivotal movement of the steps is accompanied by a change in the angular velocity of the outer edges of the steps when viewed in plan.

It is another object of this invention to provide an assembly of the character described wherein the effective length of one or more of the step chains is changed as the steps move between landing zones and the intermediate constant slope zone so as to change the distance between step axles on adjacent steps on the escalator.

It is yet an additional object of this invention to provide an assembly of the character described wherein the effective length of the step chain is changed by means of eccentric pivot cam connections between certain of the links in the chain.

These and other objects and advantages of the invention will become more readily apparent from the following detailed description of the invention when taken in conjunction with the accompanying drawings in which:

BEST MODE FOR CARRYING OUT THE INVENTION

Figure 1:
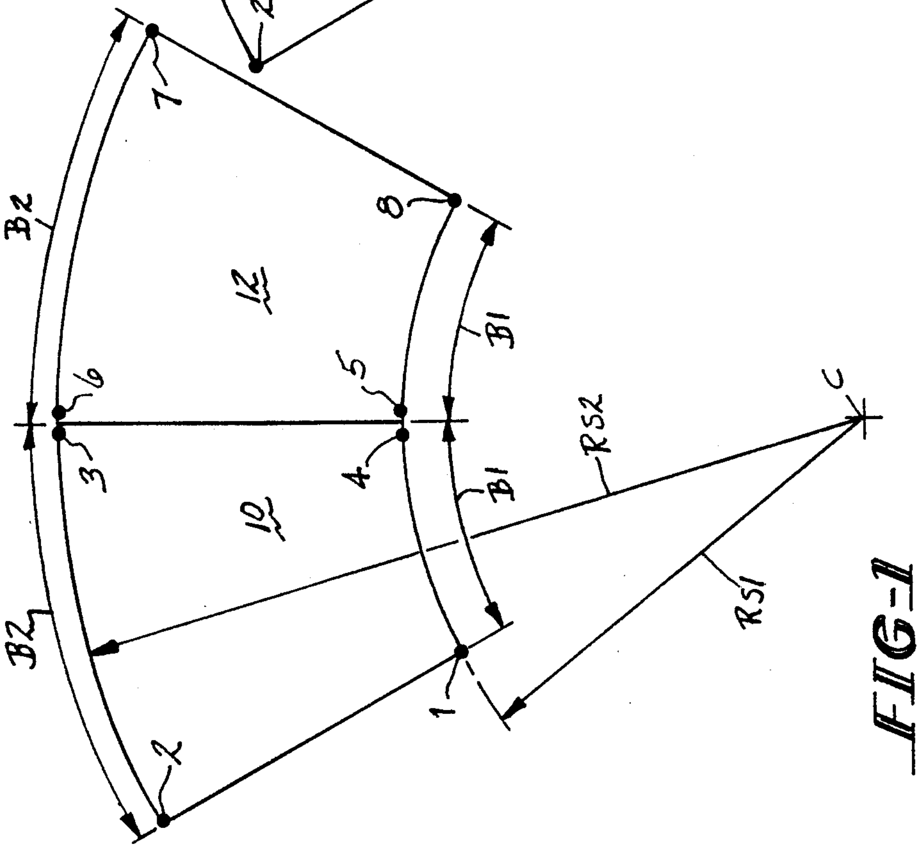
FIG. 1 is a plan view of the steps of the escalator as they appear in the horizontal landing zones of the escalator.

Referring now to FIG. 1, there are shown two steps 10 and 12 on the escalator as they would appear in plan view looking down on the treads in one of the horizontal landing zones. The steps 10, and 12 have constant arcuate inner sides of radius RS1 along which points 1, 4, 5 and 8 lie, and constant arcuate outer sides of radius RS2 along which points 2, 3, 6 and 7 lie. The radii RS1 and RS2 are struck from a fixed center C. The inner step chain has an incremental length B1 for each step 10 and 12, and the outer step chain has an incremental length B2 for each step 10 and 12.

Figure 2:
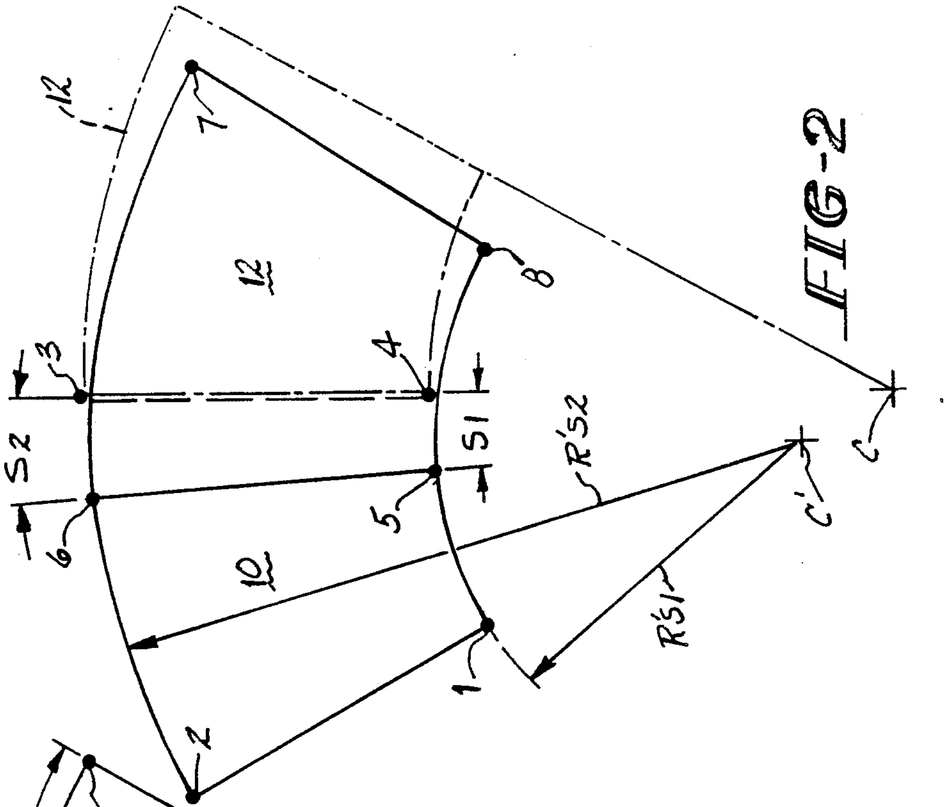
FIG. 2 is a plan view similar to FIG. 1 but showing the pivotal movement that the steps would undergo in the constant slope intermediate zone if the inner and outer step chains were kept at a constant effective length.

Referring to FIG. 2, the positions of the steps 10 and 12 are illustrated as they would appear in the intermediate constant slope incline zone of the escalator if the effective incremental lengths B1 and B2 of the inner and outer step chains were kept constant. The position of the step 12 in the landings is shown in FIG. 2 in phantom and the position of the step 12 in the incline is shown in solid lines. When the steps 10 and 12 are in the inclined zone of the escalator, assuming that step 12 is the higher step, it will have pivoted up and over the step 10 so that point 6 will have moved a distance S2 and point 5 will have moved a distance S1. This movement of the step 12 will cause the apparent radius of the inner side sections of the steps 10 and 12 to decrease to R'S1 and the apparent radius of the outer side sections of the steps 10 and 12 to decrease to R'S2 both of which will be struck from a center point C' which is offset from the original center point C.

Figures 3, 4, 5:
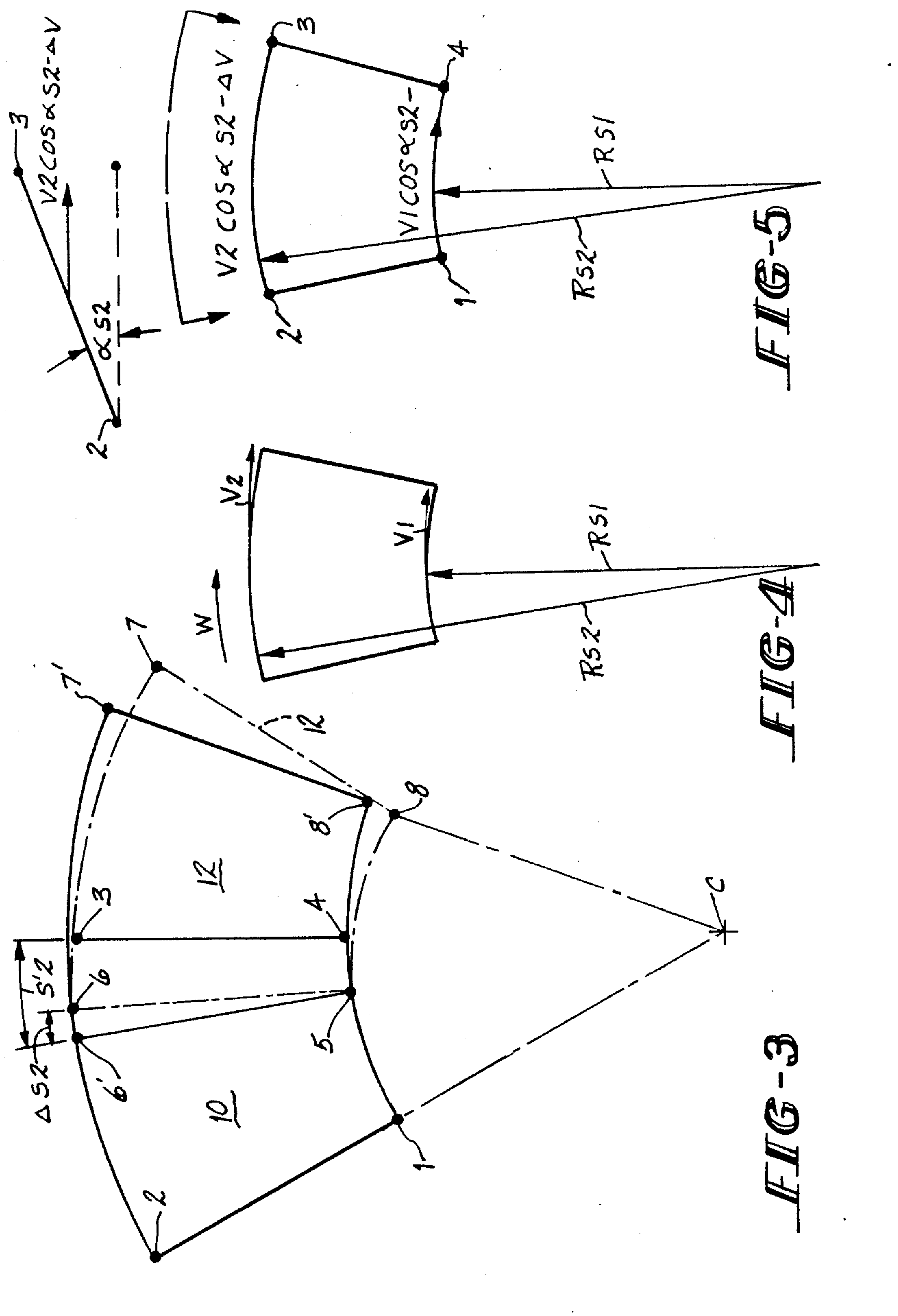
FIG. 3 is a plan view similar to FIG. 2, but showing the pivoted position of the steps in the intermediate zone when the effective length of the outside step chain is shortened while maintaining constant the effective length of the inside step chain.
FIGS. 4 and 5 are schematic views of the steps in the landing and inclined portions respectively showing how velocities can be related to step positions.

In order to counter this tendency of the steps 10 and 12 to spiral into a tighter radius path of travel, and to maintain the original radial path of travel, the step 12 must be pivoted an additional increment over the step 10 when the steps are in the intermediate inclined zone of the escalator path. In FIG. 3, the position of step 12 from FIG. 2 is shown in phantom, and the desired position needed to provide the constant radius is shown in solid lines. To achieve the desired position, the outside of the step 12 is further pivoted a distance ΔS2 so that the corners 6, 7 and 8 of the step 12 shift to positions 6', 7' and 8' respectively. The corner 5 of the step 12 can be considered as forming the pivot point and thus does not substantially shift its position. It will be appreciated that the radii described above are actually the step chain radii, but for purposes of explaining the step movement, they can be considered to be the radii of the path of movement of the inner and outer edges of the steps.

As noted, to make a constant plan radius curved escalator, the distance between point 2 and point 6 needs to get smaller while maintaining the distance between point 1 and point 5. A pivoting motion about point 5 is the result. This is done by shortening the length of the outer step chain as it goes through the entry transition zone. The result thereof is shown in FIG. 3.

The following equations can be used to calculate the required shortening of the outer step chain:

$$S1 = B1(1 - \cos\alpha s1) \qquad \text{eq. 1}$$

$$S2 = B2(1 - \cos\alpha s2) \qquad \text{eq. 2}$$

$$S'2 = \frac{Rs2\,(S1)}{Rs1} \qquad \text{eq. 3}$$

$$\Delta S2 = S'2 - S2 \qquad \text{eq. 4}$$

$$B'2 = \frac{B2 \cos\alpha\, s2 - S2}{\cos\alpha\, s2} \qquad \text{eq. 5}$$

where

- Rs1=plan radius inner step track;
- Rs2=plan radius outer step track;
- B1=incremental chain length inner step;
- B2=incremental chain length outer step;
- B'2=incremental chain length outer in transition/incline section;
- αs1=angle of inclination inner step track;
- αs2=angle of inclination outer step track;
- S1=arc length projection inner step;
- S2=arc length projection outer step;
- S'2=arc length projection outer step which will pivot the step onto the constant radius; and
- ΔS2=delta arc length projection outer step which will pivot the step onto the constant radius.

VELOCITY

The following equations show how the velocities will be related to the step positions as shown in FIGS. 4 and 5, wherein:

- V1=tangential velocity inner step edge;
- V2=tangential velocity outer step edge;
- W=angular velocity;
- Rs1=plan radius inner step track;
- Rs2=plan radius outer step track;
- αs1=angle of inclination inner step track;
- αs2=angle of inclination outer step track;
- B1=incremental chain length inner step;
- B2=incremental chain length outer step;
- ΔS2=delta arc length projection outer step which will pivot the step onto the constant radius; and
- V=delta velocity subtracted from outer step in the plan view.

For the horizontal section which is shown in FIG. 4, the following equations apply.

V1=W X Rs1

V2=W X Rs2

$$\frac{V1}{V2} = \frac{Rs1}{Rs2} = \text{constant} = K$$

$$\frac{Rs1}{Rs2} = \frac{B1}{B2}$$

For the transition section and incline section which is shown in FIG. 5, the following equations apply.

$$\frac{V1 \cos\alpha\, s1}{V2 \cos\alpha\, s2} \neq \frac{Rs1}{Rs2} = K$$

$$\frac{B1 \cos\alpha\, s1}{B2 \cos\alpha\, s2} \neq \frac{Rs1}{Rs2} = K$$

To vary the velocity of the outside step edge and vary the outside axle distance the following equations apply.

$$\frac{V1 \cos \alpha\, s1}{V2 \cos \alpha\, s2 - \Delta V} = \frac{Rs1}{Rs2} = \frac{B1 \cos \alpha\, s1}{B2 \cos \alpha\, s2 - \Delta S'2}$$

whereupon Δ V can be calculated as follows:

$$\Delta V = V2 \cos \alpha\, s2 = \frac{Rs2}{Rs1} (V1 \cos \alpha\, s1).$$

Figure 6:
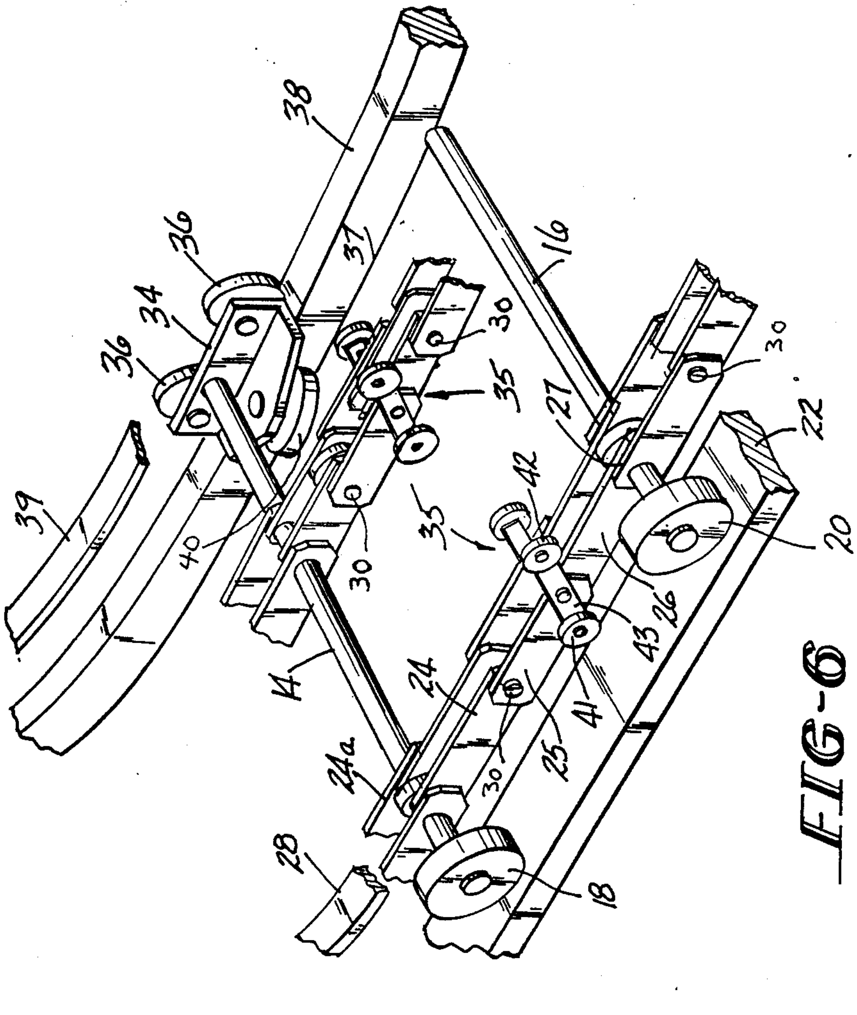
FIG. 6 is a perspective fragmented view of a step chain and track assembly formed in accordance with this invention.
Figure 7:
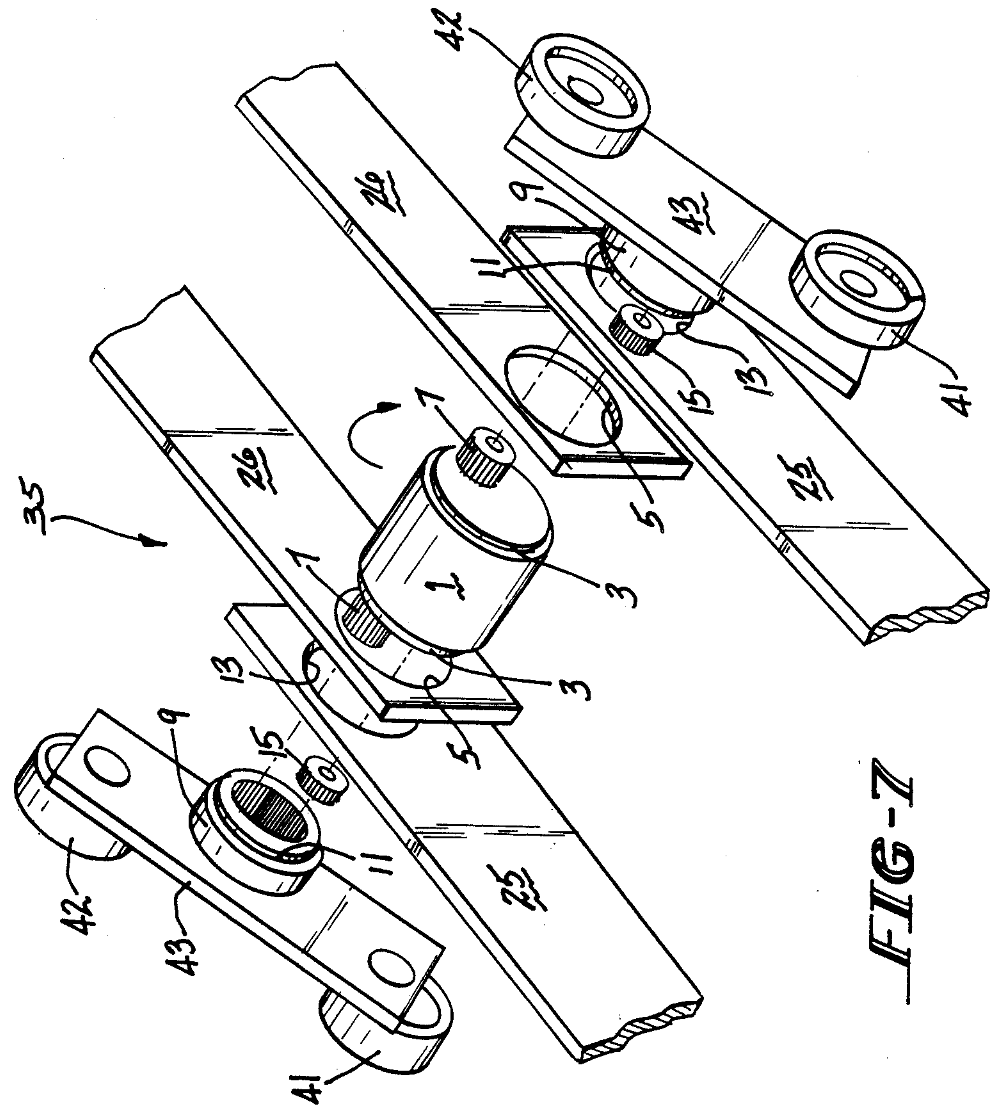
FIG. 7 is an exploded perspective view of the assembly of FIG. 6 showing the construction of the eccentric cam which operates the pivot pins.
Figure 9:
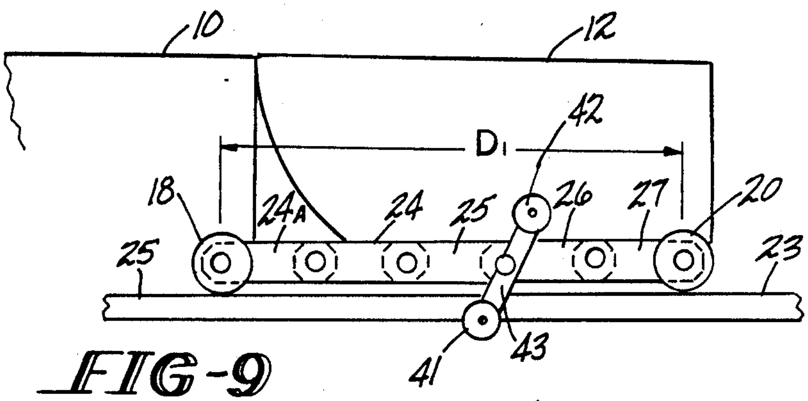
FIG. 9 is a side elevational view showing the assembly on a horizontal landing zone of the track illustrating how the effective length of the step chain is increased.
Figure 10:
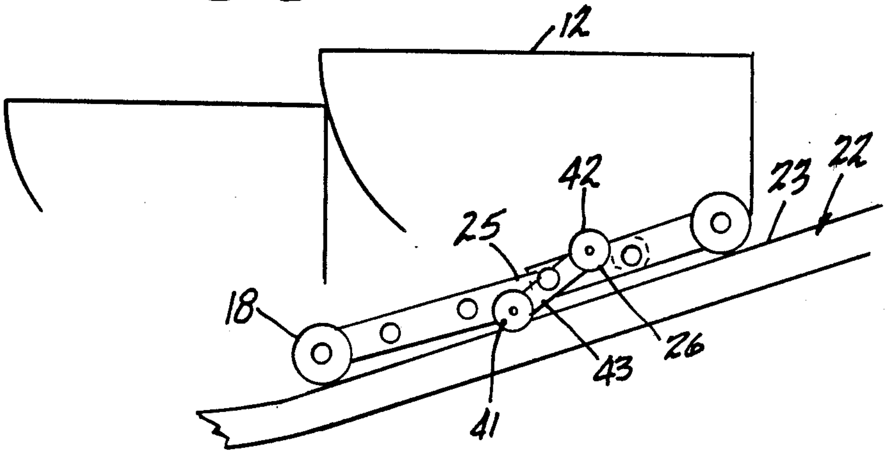
FIG. 10 is a view similar to FIGS. 8 and 9 but showing the operation of the eccentric cam in a transition zone.
Figure 8:
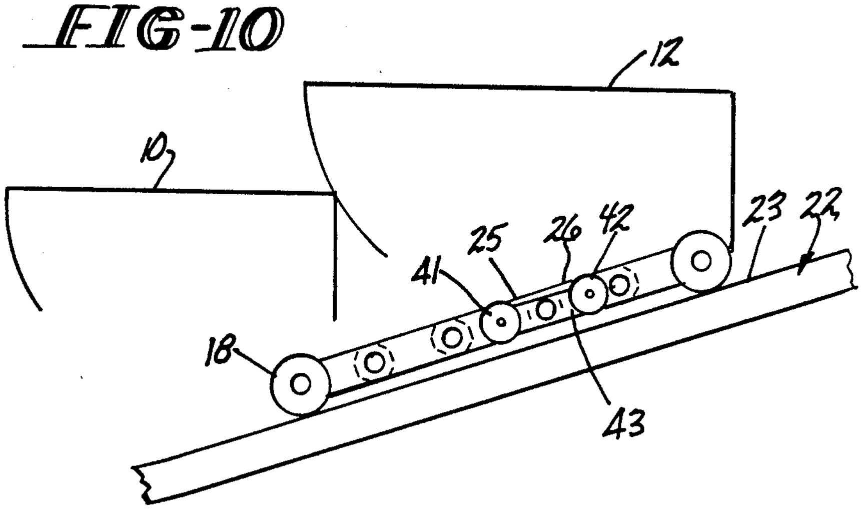
FIG. 8 is a side elevational view showing the assembly on the intermediate constant slope zone of the track illustrating how the effective length of the step chain is shortened.

Referring now to FIGS. 6–16, there is shown a preferred embodiment of a step chain and track assembly which is operable to effect the aforesaid changes in the effective length of the outer and/or inner step chains, and in the velocity of the outer and/or inner sides of the steps 10 and 12, which are shown schematically in FIGS. 8 and 9. In FIG. 6 the step chain is shown as it appears on the intermediate constant slope portion of the escalator. What is shown is one segment of the outer step chain that interconnects adjacent step axles 14 and 16. The step axle 14 is mounted on the step 10 and the axle 16 is mounted on the step 12. The step axles 14 and 16 carry rollers 18 and 20 respectively which roll along the track 22. The chain segment shown includes five links 24*a*, 24, 25, 26 and 27 which are pivotally connected to the step axles 14 and 16 respectively. An eccentric pivot cam denoted generally by the numeral 38 pivotally connects the chain links 25, 26 and is operably connected to camming rollers 41 and 42 by a camming lever 43. The links 24*a*, 24, 25, 26 and 27 are joined by spherical pin joints 30 which provide the necessary flexibility to the chain. The camming rollers 41 and 42 move along tracks along paths transversely inwardly and outwardly offset from the path that the axle rollers 18 and 20 move along. An outer upthrust track 28 is disposed above the axle rollers 18 and 20 for engagement thereby to counter upthrust forces imparted to the chain during operation of the escalator.

Referring now to FIG. 7, details of the construction of the preferred form of the eccentric pivot cam mechanism 35 are shown. As shown in FIG. 7, the components of the link 26 are inwardly adjacent to and overlap components of the link 25. A pivot pin 1 has opposite end bearing bosses 3 which are telescoped into socket holes 5 in the components of the link 26. Pinion gears 7 are fixed to the opposite ends of the pivot pin 1, with the axis of the pinion gears 7 being offset from the axis of the pivot pin 1. The camming levers 43 have inner internal ring gears 9 affixed thereto which ring gears 9 each have bearing bosses 11 which telescope into socket holes 13 in the components of the link 25. The ring gears 9, bearings bosses 11, and link holes 13 are all coaxial with the link holes 5, bearing bosses 3 and pivot pin 1. The bosses 3 and 11 are rotatably secured to the link components 26 and 25 respectively by means of snap rings (not shown) which engage suitable grooves (not shown) formed on the bosses 3 and 11. The pinion gears 7 are so positioned as to mesh with the ring gears 9 and a pinion idler gear 15 which pairs with each pinion gear 7 to maintain proper meshing of the latter with the ring gears 9 during operation of the eccentric pivot cam 35. It will be appreciated that since the pivot pin 1 abuts endwise the two ring gears 9, when the cam levers 43 are rotated vertically, the ring gears 9 will also rotate about their axes. Rotation of the ring gears 9 results in concurrent planetary movement of the pinion gears 7 which in turn causes the pivot pin 1 to be cammed about the axis of the pinion gears 7 and out of coaxial registry with the ring gears 9. Using a three-to-one gear ratio, a 60° angle rotation of the ring gears 9 will result in a 180° orbital displacement of the pinion gear 7 with a resultant shift of the pivot pin 1 and the chain link 26 as will be more clearly illustrated hereinafter.

Referring back to FIG. 6, an inner step chain 32 connects inner ends of the step axles 14 and 16. The inner step chain 32 may be of relatively conventional construction and have a constant effective length which equals its actual length, or it may be equipped with the eccentric pivot cam 38, as shown in FIG. 6. A bracket 34 is mounted on the inner end of each step axle 14, 16, the bracket 34 carrying inner step axle rollers 36 which ride on an inner track 38. The bracket 34 also carries a side thrust roller 40 which rides on the outer side surface 37 of the inner track 38. The side thrust roller 40 is operable to counter inwardly directed side thrust forces imparted to the chains and steps during operation of the escalator. An inner upthrust track 39 is disposed above the inner step axle rollers 36 to counter upthrust forces imparted to the assembly during operation of the escalator. It will be understood that the outer step chain may be shortened when in the entry transition zone and relengthened in the exit transition zone; or the inner step chain may be lengthened in the entry transition zone and reshortened in the exit transition zone; or the effective length of both of the chains can be concurrently altered to effect the necessary shifting of the steps.

Figure 11:
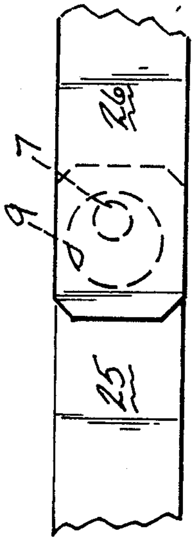
FIG. 11 is a side elevational view of the overlapped ends of adjacent links at one of the adjustable chain link joints showing the position of the eccentric pivot cam when the chain is at its longest effective length.
Figure 12:
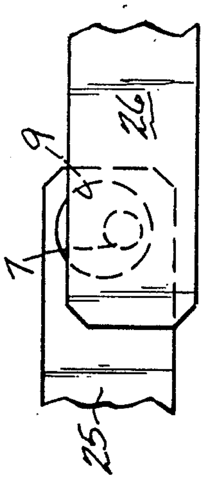
FIG. 12 is a view similar to FIG. 11 but showing the position of the eccentric pivot cam as the effective length of the chain is in the process of being shortened during a transitional zone of the escalator.
Figure 13:
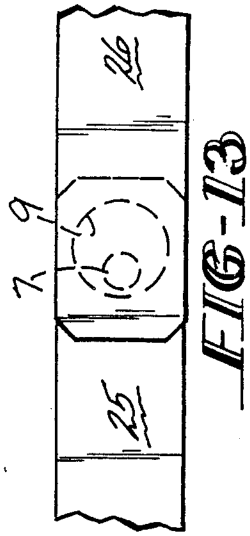
FIG. 13 is a view similar to FIG. 11 but showing the position of the eccentric pivot cam when the chain is at its shortest effective length.
Figure 14:
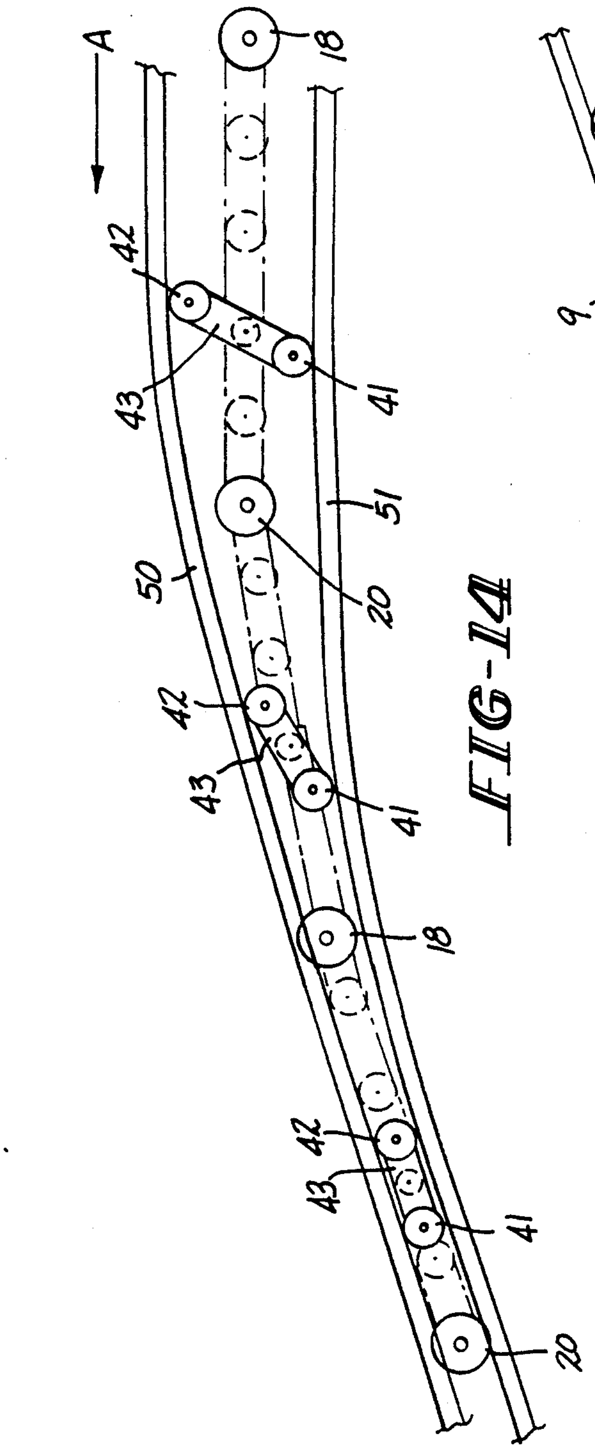
FIG. 14 is a fragmented somewhat schematic elevational view of the camming tracks in the entrance transition zone of a down escalator.
Figure 15:
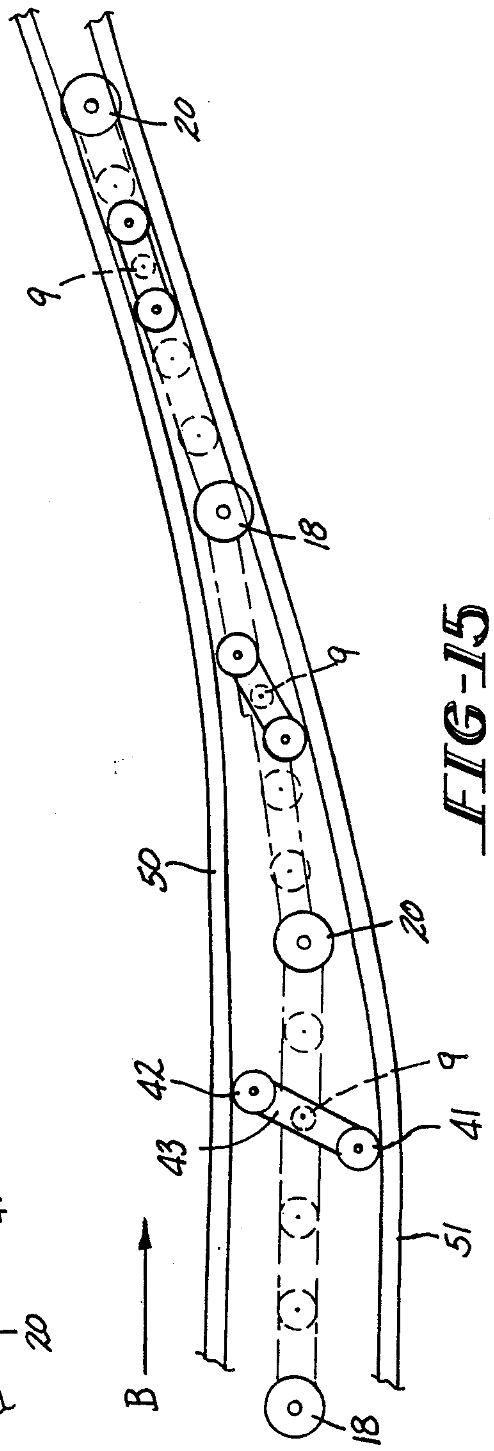
FIG. 15 is a view similar to FIG. 14 of the camming tracks in the entrance transition zone of an up escalator.
Figure 16:
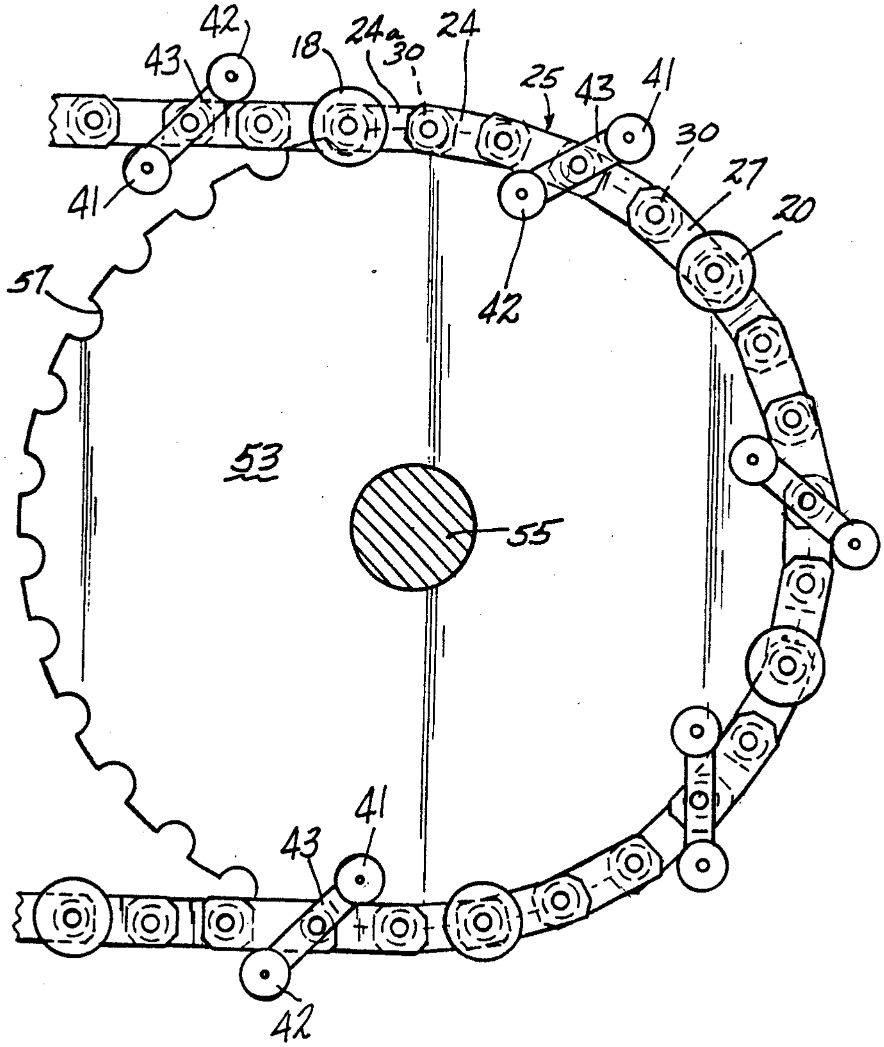
FIG. 16 is an elevational view of the turn around sprocket of the step chain of FIG. 6.

Referring now to FIGS. 8–13, the mode of operation of the invention in the flat, transitional, and constant incline zones of the escalator is illustrated. When the steps 10, 12 are in a horizontal landing area, as shown in FIG. 9, if the outer chain is adjustable then it will be at its greatest effective length, and if the inside chain is adjustable then it will be at its smallest effective length. If both chains are adjustable, then both will be as noted previously, but the amount of length adjustment of each chain will be one half of that needed when only one chain is adjustable. When the steps 10, 12 are in the constant incline zone of the escalator as shown in FIG. 8, the lengths of the chains will be the reverse of that specified for the horizontal zone. As shown in FIGS. 14 and 15, the cam rollers 41, 42 are guided by cam tracks 50 and 51 which converge and diverge in the transitional zones to cause the cam levers 43 to pivot appropriately. Arrows A and B indicate the direction of movement of the escalator in FIGS. 14 and 15, respectively. FIGS. 11–13 illustrate how the planetary gear 7 orbits in the ring gear 9 responsive to pivoting of the lever 43 to cam the chain links 25 and 26 from their shortened condition shown in FIG. 11 to their lengthened condition shown in FIG. 13 with the middle of the transition zone being shown in FIG. 12. It will be appreciated that the orbiting of the gear 7 proceeds in both directions, i.e., from 3 o'clock to 9 o'clock, and return As seen from FIG. 16, when the chain links 24*a*, 24, 25, 26, 27 are all aligned in the horizontal landing zones, they will pass easily over the turn around sprocket 53 at the entry and exit of the escalator. The sprocket 53 is mounted on a driven shaft 55 and is disposed at one of the landing ends of the escalator. It will be appreciated that the escalator is thus of conventional construction wherein the return path of the steps lies beneath the passenger-carrying path. The sprocket 53 is formed with circumferential recesses 57 which are sized so as to receive and carry the spherical joints of the step chains.

The camming levers 43 and rollers 41, 42 pass on either side of the sprocket 53 due to as the chain and steps reverse their path of travel. It will be appreciated that there will be two reversing sprockets, one at each end of the escalator, but only one of which will be a drive sprocket. The other sprocket will be formed as shown but will serve as an idler sprocket which merely guides the chain but does not drive it.

It will be readily understood that the step chain and track assembly of this invention allows the escalator path of travel to be defined by a constant radius arc derived from a fixed center point. This in turn allows for greater control of step-to-step, and step-to-skirt gaps in the escalator. Balustrades, tracks and skirts can be more easily formed and accurately installed. Additionally, the step pivoting feature of the invention assures a relatively simple mechanical form which eliminates the complex step connections described in the aforesaid prior art. The movement of the steps is completely controlled at all points in the path of travel of the escalator, and may be customized to accommodate different sweep angles, angles of inclination, and rise distances for the escalator.

It will be appreciated that the adjustments in effective chain lengths may be made in the outer step chain, the inner step chain, or both step chains, and will allow the chain and steps to smoothly pass over the turn around sprockets without drastically altering the latter. By using the chain adjustment of this invention to change the position of the steps, a compact envelope is established for housing the drive assembly for the escalator.

Since many changes and variations of the disclosed embodiments of the invention may be made without departing from the inventive concept, it is not intended to limit the invention otherwise than as required by the appended claims.

What is claimed is:

1. An escalator assembly having an arcuate path of travel defined by a constant radius derived from a fixed center as viewed in plan, the escalator including horizontal entry and exit landing zones, an intermediate constant slope zone, and entry and exit transition zones of continuously varying slope interconnecting the constant slope zone with the entry and exit landing zones respectively, said escalator having turn around sprockets at each of said landing zones for reversing the direction of travel of the moving escalator components and said escalator assembly including:

(a) inner and outer tracks extending between said landing zones and through said transition and constant slope zones for supporting movement of steps along the path of travel of the escalator;

(b) a plurality of steps, each having: an upper tread portion which remains substantially horizontal throughout a people transporting portion of the path of travel of the escalator; a step axle at inner and outer sides of each step; inner and outer step axle rollers rotatably mounted on said step axles, said step axle rollers being operable to travel over said inner and outer tracks;

(c) inner and outer step chains forming a continuous connection between said step axles whereby all of said steps are connected together by the step chains throughout the entire path of travel of the escalator; and (d) eccentric cam means connecting pairs of adjustable links in at least one of said inner and outer step chains and operable to vary the extent of overlap of said adjustable links as the steps move through each of said transition zones so as to move the outer ends of the step axles of adjacent steps toward and away from each other in said transition zones, whereby the steps are continuously guided along said arcuate path of travel.

2. The escalator assembly of claim 1 wherein said eccentric cam means includes first rotatable means mounted on one of each pair of said adjustable links and second rotatable means mounted on the other of each pair of said adjustable links, said first and second means being rotatable about respective eccentric axes, and means interconnecting said first and second means whereby rotation of said first rotatable means induces concurrent rotation of said second rotatable means operable to shift said adjustable links toward and away from each other.

3. The escalator assembly of claim 2 further comprising lever means connected to said first rotatable means and operable when pivoted to rotate said first rotatable means.

4. The escalator assembly of claim 3 further comprising roller means on said lever means, and cam tracks for controlling the path of travel of said roller means whereby deflections of said roller means by said cam tracks is operable to pivot said lever means.

5. The escalator assembly of claim 2 wherein said means interconnection comprises a set of meshing gears, one mounted on said first rotatable means and another mounted on said second rotatable means.

6. The escalator assembly of claim 5 wherein one of said meshing gears is a ring gear and the other is a pinion gear which orbits about the center of said ring gear when the latter is rotated.

7. A step chain for an escalator assembly which escalator assembly moves along a curved path of travel when viewed in plan, said step chain comprising:

(a) a plurality of serially connected links having overlapping ends;

(b) means for connecting escalator step axles to spaced apart ones of said links; and (c) rotatable eccentric camming means connecting adjacent adjustable links intermediate said spaced apart ones of said links for varying the extent of overlap of said adjustable links to selectively increase and decrease the effective length of said chain while maintaining rectilinear alignment of said adjustable links at the maximum and minimum effective lengths of the chain.

8. The step chain of claim 7 wherein each of said rotatable eccentric camming means comprises: a bearing pin mounted in an end of an inner one of each of said adjustable links, said bearing pins being rotatable in said inner links about a first rotational axis; rotary actuators mounted on an outer one of each of said adjustable links adjacent each end of said bearing pins, said actuators being rotatable on said outer links about a second rotational axis which is eccentric from said first rotational axis; and camming means connecting said bearing pins and said rotary actuators, said camming means being operable to cam said bearing pins about said second rotational axis responsive to rotation of said rotary actuators to shift said inner and outer links relative to each other whereby the effective length of the step chain is shortened or lengthened.

9. The step chain of claim 8 wherein said rotary actuators include first rotatable gear means, and said camming means comprise second rotatable gear means meshing with said first rotatable gear means.

10. The step chain of claim 9 wherein said first rotatable gear means is a ring gear and said second rotatable gear means includes a pinion gear mounted for orbital movement within said ring gear.

11. The step chain of claim 10 wherein said second rotatable gear means further includes an idler pinion gear mounted in said ring gear for orbital movement therein which mirrors orbital movement of said pinion gear.

* * * * *

UNITED STATES PATENT AND TRADEMARK OFFICE
CERTIFICATE OF CORRECTION

PATENT NO. : 4,953,685

DATED : September 4, 1990

INVENTOR(S) : Gerald Johnson

It is certified that error appears in the above-identified patent and that said Letters Patent is hereby corrected as shown below:

On the title page:
In the abstract, line 7, after "varied" insert --by--.

Col. 2, line 8, "curve" should read --curved--.

Col. 7, lines 10 and 11 should read:

$$\Delta V = V2 \cos a\, s2 - \frac{Rs2}{Rs1} (V1 \cos a\, s1).$$

Col. 8, line 57, "return" should read --return.--.

Signed and Sealed this

Third Day of March, 1992

Attest:

HARRY F. MANBECK, JR.

Attesting Officer

Commissioner of Patents and Trademarks